United States Patent
Botura et al.

(10) Patent No.: US 10,640,217 B2
(45) Date of Patent: May 5, 2020

(54) PNEUMATIC DEICER WITH SENSORS

(71) Applicant: Goodrich Corporation, Charlotte, NC (US)

(72) Inventors: Galdemir Cezar Botura, Akron, OH (US); David L. Brittingham, Canton, OH (US); Jin Hu, Hudson, OH (US); Andrew Taylor, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 311 days.

(21) Appl. No.: 15/650,566

(22) Filed: Jul. 14, 2017

(65) Prior Publication Data
US 2019/0016467 A1    Jan. 17, 2019

(51) Int. Cl.
B64D 15/16    (2006.01)
B64F 5/60     (2017.01)
F01D 25/02    (2006.01)
F02C 7/04     (2006.01)

(52) U.S. Cl.
CPC ........... B64D 15/166 (2013.01); B64F 5/60 (2017.01); *F01D 25/02* (2013.01); *F02C 7/04* (2013.01)

(58) Field of Classification Search
CPC ...... B64D 15/00; B64D 15/16; B64D 15/166; B64D 15/20; B64D 15/22
See application file for complete search history.

(56) References Cited

U.S. PATENT DOCUMENTS

| | | | | |
|---|---|---|---|---|
| 4,687,159 A | * | 8/1987 | Kageorge ............ | B64D 15/166 244/134 A |
| 4,733,834 A | | 3/1988 | Phillips, II | |
| 4,779,823 A | * | 10/1988 | Ely ...................... | B64D 15/166 244/134 A |
| 4,826,108 A | * | 5/1989 | Briscoe ................. | B64D 15/16 244/134 A |
| 4,961,549 A | * | 10/1990 | LaRue ................. | B64D 15/166 244/134 A |
| 5,112,011 A | * | 5/1992 | Weisend, Jr. ........ | B64D 15/166 244/134 A |
| 5,160,102 A | | 11/1992 | Hlavac | |
| 5,310,142 A | * | 5/1994 | Weisend, Jr. ........ | B64D 15/166 244/134 A |

(Continued)

FOREIGN PATENT DOCUMENTS

| | | |
|---|---|---|
| WO | WO0216200 A2 | 2/2002 |
| WO | WO0224525 A2 | 3/2002 |

OTHER PUBLICATIONS

Extended European Search Report for EP Application No. 18183714.7, dated Nov. 27, 2018, pp. 7.

*Primary Examiner* — Richard R. Green
*Assistant Examiner* — Michael A. Fabula
(74) *Attorney, Agent, or Firm* — Kinney & Lange, P.A.

(57) ABSTRACT

A pneumatic deicer includes a base layer, a forming layer, a first chamber, and a first sensor. The base layer has an inlet, a first side, and a second side. The forming layer is connected to the base layer along at least two seams and has inner side and an outer side with the outer side being distant from the base layer. The first chamber is formed between the base layer and the forming layer and configured to be inflated by air passing into the first chamber through the inlet in the base layer. The first sensor is situated within the first chamber.

19 Claims, 3 Drawing Sheets

(56) References Cited

U.S. PATENT DOCUMENTS

| | | | | |
|---|---|---|---|---|
| 5,337,978 | A * | 8/1994 | Fahrner | B64D 15/166 244/134 A |
| 5,523,959 | A | 6/1996 | Seegmiller | |
| 5,558,304 | A * | 9/1996 | Adams | B64D 15/00 244/134 A |
| 5,562,265 | A * | 10/1996 | Rauckhorst, III | B64D 15/166 244/134 A |
| 5,569,850 | A * | 10/1996 | Rauckhorst, III | B64D 15/20 29/610.1 |
| 5,874,672 | A * | 2/1999 | Gerardi | B64D 15/20 324/671 |
| 6,194,685 | B1 | 2/2001 | Rutherford | |
| 6,247,669 | B1 * | 6/2001 | Rauckhorst, III | B64D 15/166 244/134 A |
| 6,384,611 | B1 * | 5/2002 | Wallace | B64D 15/20 324/671 |
| 6,439,505 | B1 * | 8/2002 | Hyde | B64C 1/36 244/134 A |
| 6,443,394 | B1 * | 9/2002 | Weisend, Jr. | B64C 3/46 244/134 A |
| 6,520,452 | B1 * | 2/2003 | Crist | B64D 15/16 244/134 A |
| 9,598,176 | B2 * | 3/2017 | Giamati | B64D 15/166 |
| 9,994,324 | B2 * | 6/2018 | Hu | B64D 15/00 |
| 9,994,325 | B2 * | 6/2018 | Hu | B64D 15/16 |
| 9,994,326 | B2 * | 6/2018 | Hu | D01D 5/003 |
| 2003/0122037 | A1 * | 7/2003 | Hyde | B64D 15/166 244/134 A |
| 2014/0224934 | A1 * | 8/2014 | Fahrner | B64D 15/166 244/134 A |
| 2016/0009400 | A1 | 1/2016 | English et al. | |
| 2016/0052784 | A1 | 2/2016 | Potasek | |
| 2016/0214726 | A1 * | 7/2016 | Giamati | B64D 15/166 |
| 2017/0129622 | A1 | 5/2017 | Giamati | |

* cited by examiner

US 10,640,217 B2

PNEUMATIC DEICER WITH SENSORS

BACKGROUND

The present invention relates to deicers utilized in a gas turbine engine and, in particular, to sensors situated within an inflatable chamber in the pneumatic deicer.

Ice formation and accumulation (i.e., icing) on outer surfaces is among one of the many operational challenges faced by aircraft. Under certain atmospheric conditions, ice can accumulate rapidly on leading edge surfaces of the aircraft, reducing smooth air flow, increasing drag, and decreasing lift. Deicing equipment, such as pneumatic deicers, is utilized to remove ice buildup on the outer surfaces of the aircraft.

Pneumatic deicers (also referred to as boots) have historically included a series of inflatable chambers (also referred to as tubes) laid next to one another and are attached to an air source and in some cases at least one internal manifold. When attached to a leading edge surface, the chambers of the pneumatic deicer can be inflated to alter the profile of the external surface to remove ice that has accumulated. Sometimes, the chambers do not inflate due to various issues, including holes that may develop in the chamber or ice and/or water blocking individual air lines running from an air source to the chambers. Currently, malfunction of the individual chambers of the pneumatic deicer is only discoverable through visual inspection.

SUMMARY

One embodiment of a pneumatic deicer includes a base layer, a forming layer, a first chamber, and a first sensor. The base layer has an inlet, a first side, and a second side. The forming layer is connected to the base layer along at least two seams and has inner side and an outer side with the outer side being distant from the base layer. The first chamber is formed between the base layer and the forming layer and configured to be inflated by air passing into the first chamber through the inlet in the base layer. The first sensor is situated within the first chamber.

Another embodiment of a pneumatic deicer on an aircraft structure includes a base layer adjacent to the aircraft structure, a forming layer adjacent to the base layer, a first chamber between the base layer and the forming layer, a second chamber between the base layer and the forming layer, a first seam connecting the base layer to the forming layer and separating the first chamber from the second chamber, a first inlet in the base layer, a first air line extending from an air source to the first inlet with the first air line configured to provide air to inflate the first chamber to increase a volume of the first chamber, a first sensor situated within the first chamber, and a second sensor situated within the second chamber.

DETAILED DESCRIPTION

A pneumatic deicer with sensors is disclosed herein that includes a base layer and a forming layer that together form a chamber that receives air by an air line to inflate the forming layer to increase the volume of the chamber (i.e., the chamber is inflatable). Within the inflatable chamber is at least one sensor, and possibly multiple sensors, installed at various locations and at an inlet of the air line to the chamber. The sensors are small enough to minimize any weak points that may be caused by the rigid sensors being affixed to the flexible base layer/forming layer so as to not interfere with inflation of the resilient chamber. The sensors are able to accurately measure all or specific parameter like pressure, inflation height/displacement, vacuum (i.e., deflation height), temperature of the air, temperature of the base layer and/or forming layer, humidity of the air, cycle (i.e., how many times the chamber is inflated), and/or other characteristics. Usually, a pneumatic deicer includes multiple chambers, and sensors can be located within each chamber and/or one specific chamber. Having sensors within each individual chamber allows for quicker and easier troubleshooting of a faulty pneumatic deicer as the sensors will inform operators and maintenance personnel which chamber is malfunctioning. Having the sensor in a specific chamber minimizes the number of sensors needed while still accurately obtaining system performance information. While this disclosure describes pneumatic deicers in regard to aircraft, the scope of this disclosure also extends to aerospace, wind turbine, marine, and other industries.

Figure 1A:
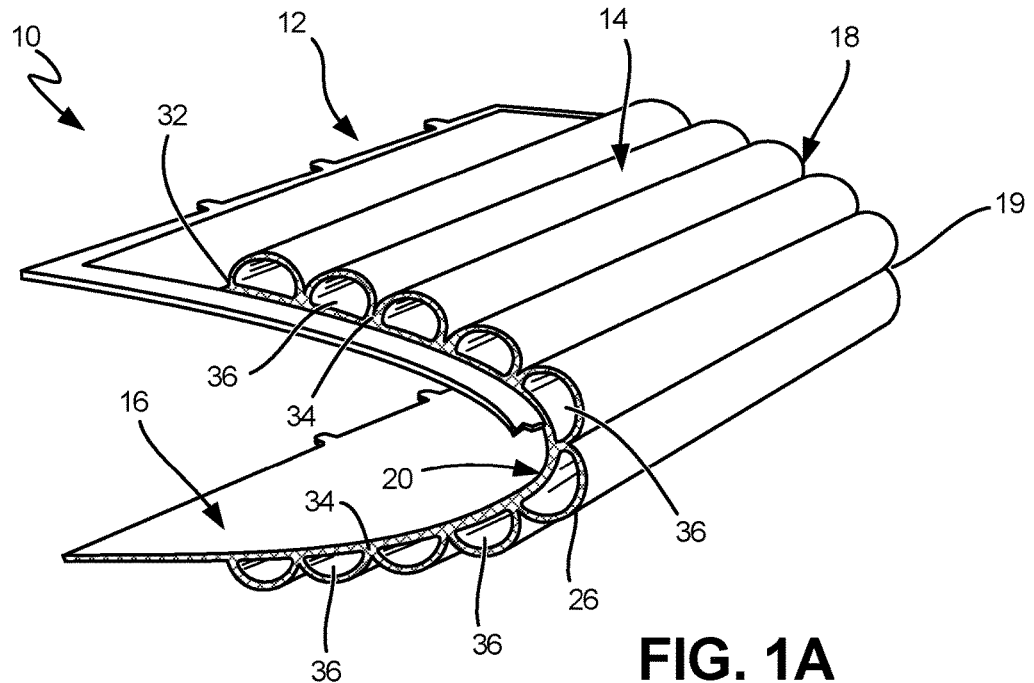
FIG. 1A is a perspective view of a deicer on an aircraft structure of an aircraft.
Figure 1B:
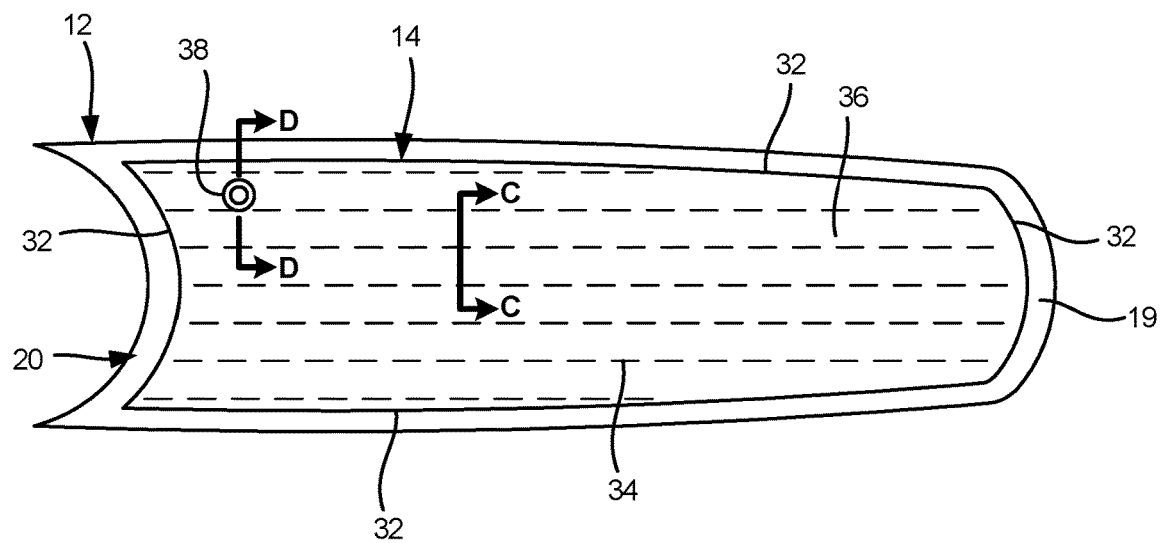
FIG. 1B is a schematic view of the deicer on the aircraft structure.
Figure 1C:
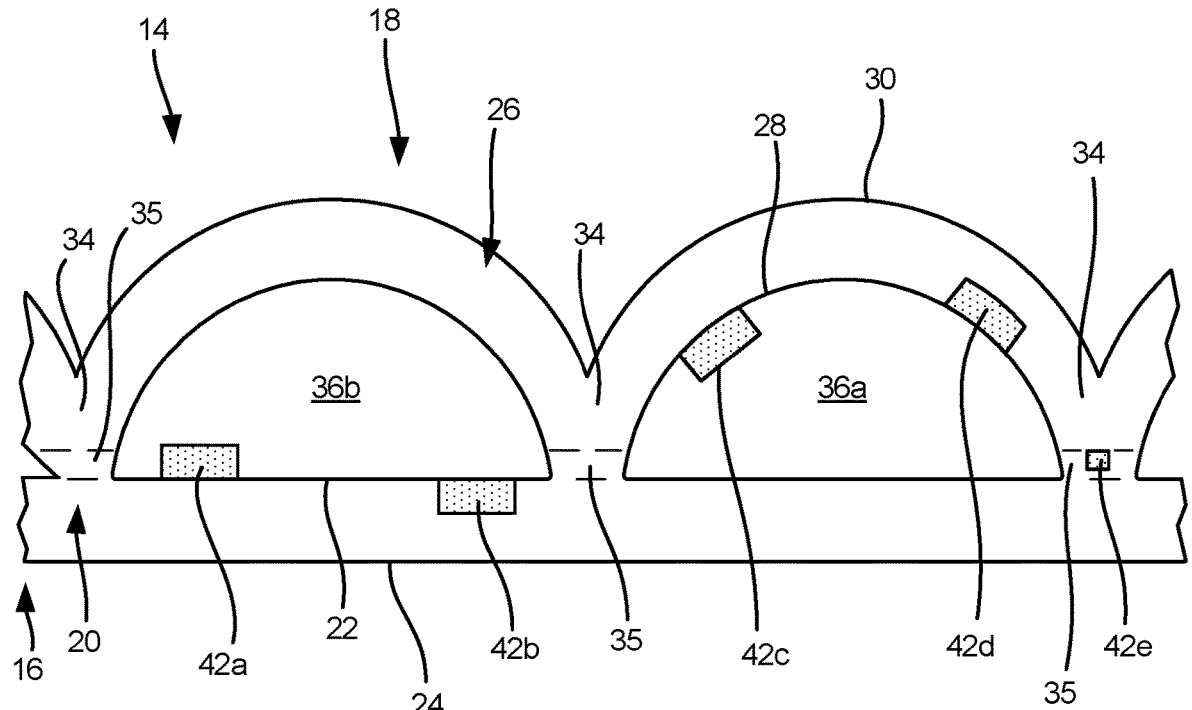
FIG. 1C is an elevation view of the deicer in FIG. 1B taken along line C-C.
Figure 1D:
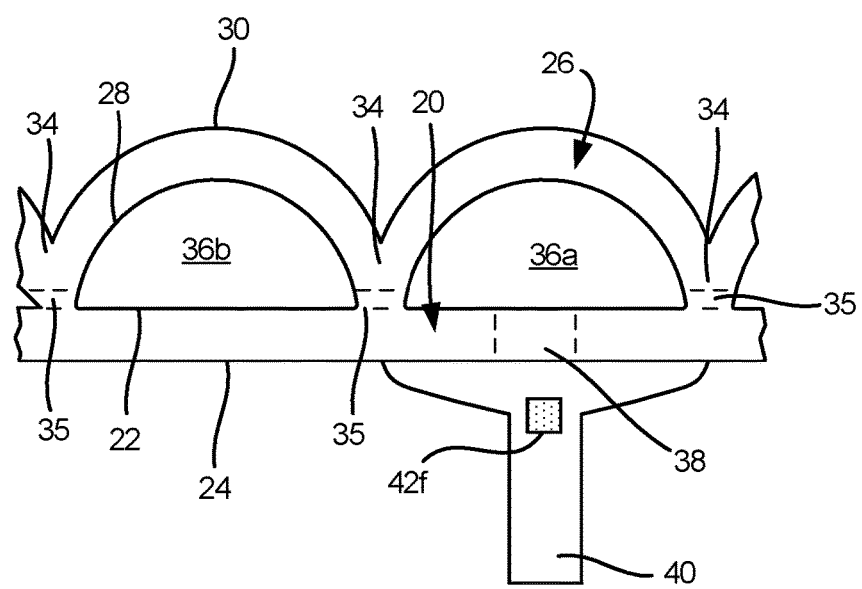
FIG. 1D is an elevation view of the deicer in FIG. 1B taken along line D-D.

FIG. 1A is a perspective view of a deicer on an aircraft structure of an aircraft, FIG. 1B is a schematic view of the deicer on the aircraft structure, FIG. 1C is an elevation view of the deicer in FIG. 1B taken along line C-C, and FIG. 1D is an elevation view of the deicer in FIG. 1B taken along line D-D. A portion of aircraft 10 includes aircraft structure 12 and deicer 14. Aircraft structure 12 includes internal side 16 and external side 18 with leading edge 19 extending along external side 18. Deicer 14 includes base layer 20 (having first side 22 and second side 24 as shown in FIGS. 1C and 1D), forming layer 26 (having inner side 28 and outer side 30 as shown in FIGS. 1C and 1D), outer seams 32 (shown in FIGS. 1A and 1D), inner seams 34 (having passages 35 as shown in FIGS. 1C and 1D), chambers 36 (including first chamber 36a and second chamber 36b), inlet 38 (shown in FIGS. 1B and 1D), air line 40 (shown in FIG. 1D), and sensors 42 (shown in FIGS. 1C and 1D).

Aircraft 10 can be any flight vehicle and includes aircraft structure 12. Aircraft structure 12 can be any aircraft component that experiences environmental conditions that make aircraft structure 12 prone to the accumulation of ice. Aircraft structure 12 can be an engine inlet, a flight control structure, an airfoil (such as a wing), an empennage (e.g., a tail), a fuselage, and/or any other exterior component. Aircraft structure 12 includes internal side 16 and external side 18. Internal side 16 is adjacent the internal components of aircraft 10, such as the mechanisms within the wings and tail of aircraft 10. External side 18 experiences the environment and is the side upon which deicer 14 is located. When aircraft structure 12 has a curved shape, leading edge 19 extends horizontally along external side 18 and forms a forward-most edge of aircraft structure 12.

Deicer 14 is on external side 18 of aircraft structure 12. Deicer 14 is a pneumatic deicer (also referred to in the art as a boot), but in other embodiments can be other types of deicers. Deicer 14 is configured to physically break ice off of aircraft structure 12 by inflating chambers 36 (also referred to in the art as tubes) to manipulate external side 18 to alter the surface geometry, which breaks the rigid ice off external side 18. Deicer 14 can be utilized on any surface that is prone to experiencing icy conditions. Aircraft 10 can include multiple deicers 14 on aircraft structure 12 and on other surfaces. While FIGS. 1A-1D show only one deicer 14, multiple deicers 14 can be located on aircraft structure 12 in parallel or in series and can include one air source that provides air to multiple deicers 14 through multiple individual air lines 40. The disclosure only shows a spanwise/longitudinal deicer 14; however, a deicer that is transverse to leading edge 19, a clamshell deicer, or any other configuration of an inflatable deicer is within the scope of this disclosure.

Base layer 20 is adjacent aircraft structure 12 with first side 22 facing outward and second side 24 being in contact with and adjacent to aircraft structure 12. Base layer 20 extends along aircraft structure 12 to form an inner side of chambers 36. Base layer 20 can extend passed chambers 36 as shown in FIG. 1A to form a smooth transition with aircraft structure 12 at a location where chambers 36 are not located. Base layer 20 can include one or multiple inlets 38, which are openings that to allow air to flow through base layer 20 and enter/exit chambers 36. Base layer 20, for example, can be constructed from a variety of materials, including a resilient material (such as rubber), composite, metal, alloy, or another material. Base layer 20 is generally a resilient material, and in the illustrated embodiments, base layer 20 is rubber or another flexible material. In the disclosed embodiment, base layer 20 is one continuous component extending along aircraft structure 12 to form the inner surface for multiple chambers 36. Other embodiments of deicer 14 can include a base layer 20 that is a number of individual components extending along aircraft structure 12 for only one chamber 36, a portion of one chamber 36, or a small number of chambers 36. In the illustrated embodiment, base layer 20 is one continuous and monolithic component with forming layer 26 (connected at outer seams 32 and inner seams 34) such that base layer 20 and forming layer 26 are molded or otherwise constructed together. Base layer 20 has sufficient thickness to prevent air/fluid from leaking out chambers 36 except through inlet 38.

Forming layer 26 is outward from first side 22 of base layer 20. Forming layer 26 extends along base layer 20, includes inner side 28 that forms an outer side of chambers 36, and includes outer side 30 that is in contact with the environment and is the surface upon which ice can accumulate. Forming layer 26 can, for example, be constructed from a variety of materials including a resilient material (such as rubber), composite, metal, alloy, or another material. Forming layer 26 is generally a resilient material, and in the illustrated embodiments, forming layer 26 is rubber or another flexible material that is able to expand and contract when air is pumped into and suctioned out of chambers 36. Forming layer 26 can include a coating or other means to protect outer side 30 from developing holes or otherwise becoming damaged due to contact with the environment. In the disclosed embodiment, forming layer 26 is continuous component extending along base layer to form the outer surface for multiple chambers 36. However, other embodiments of deicer 14 can include a forming layer 26 that is a number of individual components extending along base layer 20 for only one chamber 36, a portion of one chamber 36, or a small number of chambers 36. As mentioned above, forming layer 26 is continuous and monolithic component with base layer 20 (connected by outer seams 32 and inner seams 34) such that the two are molded or otherwise constructed together, but other embodiments can include a configuration in which base layer 20 and forming layer 26 are two separate pieces. Forming layer 26 has sufficient thickness to prevent air/fluid from leaking out chambers 36 and limit the probability of a hole developing in forming layer 26 due to ice or other environmental factors.

Outer seams 32 and inner seams 34 are lines at which base layer 20 is connected to forming layer 26. Inner seams 34 connect base layer 20 to forming layer 26 along a line between two chambers 36, while outer seams 32 connect base layer 20 to forming layer 26 along a line adjacent only to one chamber 36 near an edge of deicer 14. Outer seams 32 form complete air-tight seals along a total length of outer seams 32 such that no air can flow out of chamber 36 through outer seams 32. Inner seams 34 can be configured to form complete air-tight seals along a total length of inner seams 34 such that no air can flow between adjacent chambers 36. If deicer 14 includes a configuration in which inner seams 34 completely seal off adjacent chambers 36 from one another, than each chamber 36 will include inlet 38 and an individual air line 40 to provide air to inflate each chamber 36. However, inner seams 34 as disclosed are configured to form a seal with passages 35 between chambers 36 that allow air to flow between adjacent chambers 36 but not out through forming layer 26 and base layer 20 except through inlet 38. Inner seams 34 are shown as dashed lines in FIG. 1B, while outer seams 32 are shown as solid lines in FIG. 1B. With inner seams 34 including passages 35, only one or a limited number of inlets 38 are needed to provide air to inflate multiple chambers 36 because the air provided at inlet 38 can flow through passages 35 and inflate multiple chambers 36. Outer seams 32 and inner seams 34 can attach base layer 20 to forming layer 26 through a variety of means, including adhesive, sewing, or molding base layer 20 and forming layer 26 at the same time so that the two are constructed monolithically from the same material.

Chambers 36 (also referred to as tubes) are formed on an inner side by base layer 20 and on an outer side by forming layer 26. Deicer 14 in the disclosed embodiments includes multiple chambers 36 adjacent to one another as formed by outer seams 32 and inner seams 34. Specifically, FIGS. 1C and 1D show first chamber 36a and second chamber 36b, but deicer 14 includes multiple other chambers 36. As shown in FIGS. 1A and 1B, chambers 36 are arranged in parallel next to one another, and each chamber 36 can be arranged to extend generally parallel/longitudinal to leading edge 19 of aircraft structure 12. In other embodiments, chambers 36 can be arranged to extend transversely over leading edge 19. Deicer 14 can be configured such that chambers 36 alternate inflating and deflating (i.e., when one chamber 36 is inflated, adjacent chambers 36 are deflated and vice versa). Chambers 36 deflate when aircraft structure 12 is clear and free of ice. When ice accumulates and is present on aircraft structure 12, chambers 36 are inflates with air to break up and remove the ice. Further, deicer 14 can be on a schedule/timer that inflates and deflates chambers 36 depending upon a time, not upon whether ice has accumulated on external side 18. While shown as having an elongated shape with a semicircular cross section when inflated, chambers 36 can have any length, width, and shape. Further, adjacent chambers 36 can have different lengths, widths, and shapes with some chambers 36 inflating to a lesser volume than other chambers 36. When inflated by being provided air through air line 40 and inlet 38, chambers 36 have a volume such that forming layer 26 extends away from base layer 20 to alter the surface geometry of outer side 30 of forming layer 26 to break ice off external side 18. Suction can be applied to chambers 36 (i.e., a vacuum can be created within chambers 36) through air line 40 and inlet 38 to form a vacuum to completely deflate chambers 36 such that a volume of each chamber 36 is approximately zero. When chambers 36 are deflated, forming layer 26 is in contact with and planar with base layer 20 to make outer side 30 of forming layer 26 generally smooth/non-corrugating. Chambers 36 in a deflated configuration generally form a surface that is more efficient for flight than an inflated configuration (i.e., forms a more efficient airfoil that produces less drag and more lift), so flight of aircraft 10 with chambers 36 in the deflated configuration is usually desired. Thus, deicer 14 will cycle between the inflated configuration and the deflated configuration during icy conditions to break ice off of outer side 30 of forming layer 26 while also maximizing the amount of time aircraft 10 flies during the more efficient deflated configuration. Further, cycling between the inflated configuration and the deflated configuration is necessary to break the ice off of aircraft structure 12 because the physical manipulation of the surface geometry of outer side 30 of forming layer 26 is what breaks ice off of aircraft structure 12, not the corrugated surface geometry of forming layer 26 when chambers 36 are inflated.

Air line 40 conveys air from an air source on aircraft 10 to chambers 36 through inlet 38 in base layer 20. Air line 40 can also be configured to provide suction to chambers 36 to completely deflate chambers 36. Air line 40 connects the air source to inlet 38, which is shown in FIG. 1D as being in base layer 20 and extending into first chamber 36a. As mentioned above, if passages 35 are present within inner seams 34 between adjacent chambers 36, each deicer 14 can include only one or a small number of inlets 38 and air lines 40. However, if chambers 36 are completely sealed from one another by inner seams 34, each chamber 36 includes at least one inlet 36 and air line 40 to provide air, and possibly suction, to each chamber 36. Inlet 38 and air line 40 are sized to adequately provide air to chambers 36 and to allow for suctioning of chambers 36 if needed. Additionally, air line 40 can include components that provide attachment to base layer 20 and inlet 38, and air line 40 can extend into and through inlet 38 in base layer 20. Air line 40 can be a rubber hose or another component or material to convey air from air source to deicer 14 to inflate chambers 36 and allow for suction to deflate chambers 36.

Sensors 42 are positioned throughout deicer 14 to collect data regarding the characteristics and functionality of deicer 14 to provide such data to the flight crew, operators, maintenance personnel, and/or other analyzing systems (such as a computer processor) to aid in determining whether deicer 14 is functioning properly and if/when deicer 14 will need maintenance. Optionally, sensors 42 can be located within one, a select number of, or all of chambers 36; within inlet 38 and/or air line 40; within passages 35 in inner seams 34 between chambers 36; or other locations. For example, sensors 42 can be located on first side 22 of base layer 20 (sensor 42a in FIG. 1C), embedded in first side 22 of base layer 20 (sensor 42b in FIG. 1C), on inner side 28 of forming layer 26 (sensor 42c in FIG. 1C), embedded in inner side 28 of forming layer 26 (sensors 42d in FIG. 1C), and/or within passages 35 within inner seams 34 between chambers 36 (sensors 42e in FIG. 1C). Sensors 42 can also be located within inlet 38 or within air line 40 near inlet 38 (sensors 42f in FIG. 1D). Each chamber 36 can include multiple sensors 42, each inner seam 34 can include multiple sensors 42, and each inlet 38 and/or air line 40 can include multiple sensors 42. Sensors 42 collect measurements and convey those measurements to an operator of aircraft 10 or some other means for analyzing those measurements.

Sensors 42 can be any type of sensors, but sensors 42 should be small enough in size as to not interfere with the inflation and deflation of chambers 36. In the disclosed embodiment, sensors 42 are sized to have a ratio of thickness of each sensor 42 to a thickness of base layer 20 of approximately 0.1 and a ratio of thickness of each sensor 42 to a thickness of forming layer 26 of approximately 0.05-0.1. These ratios are provided as examples only, and sensors 42 within deicer 14 should include a configuration that does not interfere with the integrity and performance of deicer 14. Further, different types and configurations of sensors 42 can be located on/within different surfaces of deicer 42. For example, sensors 42 configured to measure a pressure of the air within each chamber 36 (the pressure during inflation and the vacuum during deflation) can be located on base layer 20, and sensors 42 configured to measure the temperature of the air and/or certain materials of deicer 14 can be located in/within a non-inflating area or low erosion inflating area of deicer 14.

Sensors 42 can be part of a microelectromechanical system ("MEMS") that analyzes the measurements collected by sensors 42, and sensors 42 can be wired or wireless. Sensors 42 can be powered through radio-frequency identification (RFID), piezo movement, temperature change, or another means. Sensors 42 can be a variety of different types of sensors each configured to collect one or a variety of types of data. For example, sensors 42 can be configured to collect/measure one or multiple parameters, such as the following data: a pressure of the air within each chamber 36 (i.e., the pressure during inflation of each chamber 36 and possibly the vacuum created during deflation of each chamber 36); a inflation and deflation height/displacement of forming layer 26 relative to base layer 20; a temperature of the air within each chamber 36 and/or air line 40; a temperature of base layer 20 and/or forming layer 26; and a number of cycles of each chamber 36 (i.e., how many times chamber 36 is inflated and deflated). Sensors 42 may be configured to collect other data that is useful to the flight crew, operator, maintenance personnel, and others.

Sensors 42 are rigid members, so sensors 42 create weak points when embedded within or fastened on the surface of the resilient base layer 20 and forming layer 26, which need to flex and contract as chambers 36 inflate and deflate. Thus, the larger sensor 42 is, the greater the weak point because base layer 20 or forming layer 26 cannot expand over the area upon which sensors 42 are located or embedded within. Previous sensors were too large to be located within chambers 36, passages 35, inlet 38, and air line 40 and would cause deicer 14 to develop holes and malfunction. Thus, sensors were only present near the air source. With the air source providing air to multiple deicers 14, and each deicer 14 having multiple chambers 36, determining which chamber 36 on which deicer 14 was malfunctioning required visual inspection. However, sensors 42 in the disclosed embodiments are small enough as to minimize the weak points and reduce the risk of damage caused to base layer 20, forming layer 26, and the other components of deicer 14. Sensors 42 throughout deicer 14, and more particularly within chambers 36, allow for the operator and maintenance personnel of aircraft 10 to determine which chamber 36 or deicer 14 in a multiple deicer configuration is malfunctioning without the need for visual inspection. Further, the data collected by sensors 42 can allow for predictive monitoring of deicer 14 and give flight crew, operators and/or maintenance personnel an estimate/prediction as to when deicer 14 may need maintenance and/or replacement.

Figure 2:
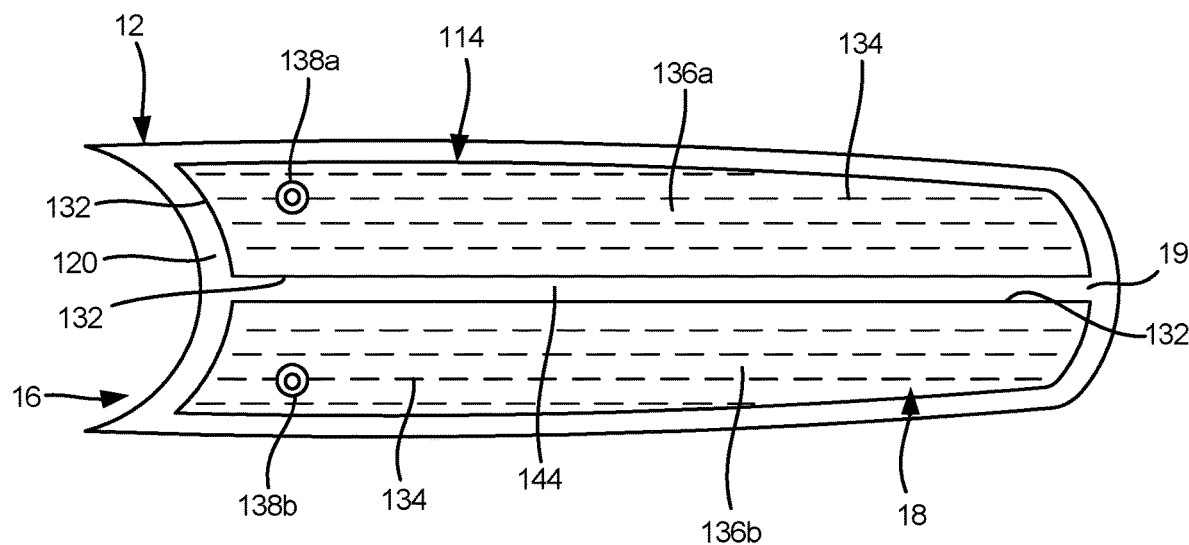
FIG. 2 is a schematic view of an alternative embodiment of the deicer of FIGS. 1A-1D.

FIG. 2 is a schematic view of an alternative embodiment of the deicer of FIGS. 1A-1D. Aircraft structure 12 includes internal side 16, external side 18, and leading edge 19 extending along external side 18. Deicer 114 includes many of the same components of deicer 14 shown in FIGS. 1A-1D, including a forming layer, an air line, and sensors. Deicer 114 as shown in FIG. 2 includes base layer 120, outer seams 132, inner seams 134, chambers 136 (including first set of chambers 136*a* and second set of chambers 136*b*), inlets 138 (including first inlet 138*a* and second inlet 138*b*), and noninflatable band 144.

Deicer 114 of FIG. 2 has the same configuration and functionality of deicer 14 of FIGS. 1A-1D, except that deicer 114 includes noninflatable band 144 extending along leading edge 19 of aircraft structure 12. Noninflatable band 144 is between two outer seams 132 extending along leading edge 19, and separates chambers 136 into two fluidically separated sets, first set of chambers 136*a* and second set of chambers 136*b*. With first set of chambers 136*a* being separated from second set of chambers 136*b*, first set of chambers 136*a* includes first inlet 138*a* connected to the air line. Second set of chambers 136*b* includes second inlet 138*b* also connected to the air line (i.e., the air line can fork or otherwise connect to both first inlet 138*a* and second inlet 138*b*). Each set of chambers 136 can have multiple inlets 138, but each set of chambers 136 must include at least one inlet 138 connected to the air line. Noninflatable band 144 can be base layer 120 extending along aircraft structure 12 or can be another configuration, such as base layer 120 and a forming layer that are bonded to one another along a width and length of noninflatable band 144 between adjacent outer seams 132. As with deicer 14, deicer 114 of FIG. 2 includes sensors that are within chambers 136, inlets 138, and/or the air line. The sensors include the same capabilities and can be placed at the same or different locations as sensors 42 described in relation to FIGS. 1A-1D.

Pneumatic deicer 14/114 with sensors 42 is disclosed herein that includes base layer 20/120 and forming layer 26 that together form at least one chamber 36/136 that receives air from air line 40 to inflate forming layer 26 to increase the volume of chamber 36/136 (i.e., chamber 36/136 is inflatable and deflatable). Further, air line 40 can be configured to provide suctioning to chamber 36/136 to aid in the deflation of chamber 36/136. Deicer 14/114 includes at least one sensor 42, and possibly multiple sensors 42, installed at various locations, such as within chamber 36/136, at inlet 38/138, and within air line 40. Sensors 42 are configured to be small enough to minimize any weak points that may be caused by the rigid sensors 42 so as to not interfere with inflation and deflation of the resilient chamber 36/136. Sensors 42 are able to accurately measure the pressure, inflation/deflation displacement, vacuum (i.e., deflation height), temperature of the air, temperature of base layer 20/120 and/or forming layer 26, humidity of the air, cycle (i.e., how many times chamber 36/136 is inflated and deflated), and/or other characteristics. Usually, pneumatic deicer 14/114 includes multiple chambers 36/136, and sensors 42 can be located within each chamber 36/136. Having sensors 42 within each individual chamber 36/136 allows for quicker and easier troubleshooting of a faulty pneumatic deicer 14/114 as sensors 42 will inform operators and maintenance personnel which chamber 36/136 is malfunctioning instead of forcing operators and maintenance personnel to visually inspect deicer 14/114.

Discussion of Possible Embodiments

The following are non-exclusive descriptions of possible embodiments of the present invention.

A pneumatic deicer includes a base layer, a forming layer, a first chamber, and a first sensor. The base layer has an inlet, a first side, and a second side. The forming layer is connected to the base layer along at least two seams and has inner side and an outer side with the outer side being distant from the base layer. The first chamber is formed between the base layer and the forming layer and configured to be inflated by air passing into the first chamber through the inlet in the base layer. The first sensor is situated within the first chamber.

The pneumatic deicer of the preceding paragraph can optionally include, additionally and/or alternatively, any one or more of the following features, configurations and/or additional components:

Wherein the first sensor is located on the first side of the base layer.

Wherein the first sensor is embedded in the first side of the base layer.

Wherein the first sensor is located on the inner side of the forming layer.

Wherein the first sensor is embedded in the inner side of the forming layer.

A second sensor embedded in the first side of the base layer.

An air line extending from an air source to the inlet in the base layer to provide air to inflate the forming layer to increase a volume of the first chamber.

A second sensor in the air line.

Wherein the first sensor measures a displacement of the forming layer relative to the base layer to determine at least one of an amount of inflation of the first chamber and a rate of inflation of the first chamber.

Wherein the first sensor measures at least one of a temperature of the air within the first chamber, a pressure of the air within the first chamber, and a humidity of the air within the first chamber.

A second chamber formed by the base layer and the forming layer and separated from the first chamber by a first seam of the at least two seams with the first seam including at least one passage to allow air to flow between the first chamber and the second chamber.

A second sensor within the second chamber.

Wherein air that is provided to the first chamber inflates the first chamber and the second chamber simultaneously.

Wherein the first sensor is at a first location and the pneumatic deicer includes a second sensor at a second location within the first chamber, a third sensor at a third location within the first chamber, and a fourth sensor at a fourth location within the first chamber.

Wherein the first sensor is a wireless sensor.

Wherein the first chamber formed by the base layer and the forming layer has an elongated shape.

Wherein a volume of the first chamber when the forming layer is deflated is less than a volume of the first chamber when the forming layer is inflated.

Another embodiment of a pneumatic deicer on an aircraft structure includes a base layer adjacent to the aircraft structure, a forming layer adjacent to the base layer, a first chamber between the base layer and the forming layer, a second chamber between the base layer and the forming layer, a first seam connecting the base layer to the forming layer and separating the first chamber from the second chamber, a first inlet in the base layer, a first air line extending from an air source to the first inlet with the first air line configured to provide air to inflate the first chamber to increase a volume of the first chamber, a first sensor situated within the first chamber, and a second sensor situated within the second chamber.

The pneumatic deicer of the preceding paragraph can optionally include, additionally and/or alternatively, any one or more of the following features, configurations and/or additional components:

Wherein the first chamber is isolated from the second chamber and the pneumatic deicer includes a second inlet in the base layer adjacent the second chamber, and a second air line extending from an air source to the second inlet with the second air line configured to provide air to inflate the second chamber to increase a volume of the second chamber.

At least one passage between the first chamber and the second chamber to allow air to flow from the first chamber into the second chamber to inflate the second chamber to increase a volume of the second chamber.

A third chamber between the base layer and the forming layer.

A second seam connecting the base layer to the forming layer and separating the first chamber from the third chamber.

At least one passage between the first chamber and the third chamber to allow air to flow from the first chamber into the third chamber to inflate the forming layer to increase a volume of the third chamber.

A third sensor situated within the third chamber.

Wherein the first sensor is configured to measure at least one of a pressure of the air within the first chamber, a temperature of the air within the first chamber, a humidity of the air within the first chamber, a rate of inflation of the first chamber, and an amount of inflation of the first chamber.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pneumatic deicer comprising:
a base layer having an inlet, a first side, and a second side;
a forming layer connected to the base layer along at least two seams, the forming layer having an inner side and an outer side with the outer side being distant from the base layer;
a first chamber formed between the base layer and the forming layer and configured to be inflated by air passing into the first chamber through the inlet in the base layer; and
a first sensor situated within the first chamber with the first sensor being a wireless sensor.

2. The pneumatic deicer of claim 1, wherein the first sensor is located on the first side of the base layer.

3. The pneumatic deicer of claim 1, wherein the first sensor is embedded in the first side of the base layer.

4. The pneumatic deicer of claim 1, wherein the first sensor is located on the inner side of the forming layer.

5. The pneumatic deicer of claim 1, wherein the first sensor is embedded in the inner side of the forming layer.

6. The pneumatic deicer of claim 5, further comprising:
a second sensor embedded in the first side of the base layer.

7. The pneumatic deicer of claim 1, further comprising:
an air line extending from an air source to the inlet in the base layer to provide air to inflate the forming layer to increase a volume of the first chamber; and
a second sensor in the air line.

8. The pneumatic deicer of claim 1, wherein the first sensor measures a displacement of the forming layer relative to the base layer to determine at least one of an amount of inflation of the first chamber and a rate of inflation of the first chamber.

9. The pneumatic deicer of claim 1, wherein the first sensor measures at least one of a temperature of the air within the first chamber, a pressure of the air within the first chamber, and a humidity of the air within the first chamber.

10. The pneumatic deicer of claim 1, further comprising:
second chamber formed by the base layer and the forming layer and separated from the first chamber by a first seam of the at least two seams, the first seam including at least one passage to allow air to flow between the first chamber and the second chamber; and
a second sensor within the second chamber.

11. The pneumatic deicer of claim 10, wherein air that is provided to the first chamber inflates the first chamber and the second chamber simultaneously.

12. The pneumatic deicer of claim 1, wherein the first sensor is at a first location and the pneumatic deicer further comprises:
a second sensor at a second location within the first chamber;
a third sensor at a third location within the first chamber; and
a fourth sensor at a fourth location within the first chamber.

13. The pneumatic deicer of claim 1, wherein the first chamber formed by the base layer and the forming layer has an elongated shape.

14. The pneumatic deicer of claim 1, wherein a volume of the first chamber when the forming layer is deflated is less than a volume of the first chamber when the forming layer is inflated.

15. A pneumatic deicer for an aircraft structure comprising:
a base layer adjacent to a structure prone to ice accumulation;
a forming layer adjacent to the base layer;
a first chamber between the base layer and the forming layer;
a second chamber between the base layer and the forming layer;
a first seam connecting the base layer to the forming layer and separating the first chamber from the second chamber;
a first inlet in the base layer;
a first air line extending from an air source to the first inlet, the first air line configured to provide air to inflate the first chamber to increase a volume of the first chamber;
a first sensor situated within the first chamber and configured to measure at least one of a pressure of the air within the first chamber, a temperature of the air within the first chamber, a humidity of the air within the first chamber, a rate of inflation of the first chamber, and an amount of inflation of the first chamber; and a second sensor situated within the second chamber.

16. The pneumatic deicer of claim 15, wherein the first chamber is isolated from the second chamber and the pneumatic deicer further comprising:
- a second inlet in the base layer adjacent the second chamber; and
- a second air line extending from an air source to the second inlet, the second air line configured to provide air to inflate the second chamber to increase a volume of the second chamber.

17. The pneumatic deicer of claim 15, further comprising:
at least one passage between the first chamber and the second chamber to allow air to flow from the first chamber into the second chamber to inflate the second chamber to increase a volume of the second chamber.

18. The pneumatic deicer of claim 15, further comprising:
- a third chamber between the base layer and the forming layer;
- a second seam connecting the base layer to the forming layer and separating the first chamber from the third chamber;
- at least one passage between the first chamber and the third chamber to allow air to flow from the first chamber into the third chamber to inflate the forming layer to increase a volume of the third chamber; and
- a third sensor situated within the third chamber.

19. A pneumatic deicer comprising:
a base layer having an inlet, a first side, and a second side;
a forming layer connected to the base layer along at least two seams, the forming layer having an inner side and an outer side with the outer side being distant from the base layer;
a first chamber formed between the base layer and the forming layer and configured to be inflated by air passing into the first chamber through the inlet in the base layer; and
a first sensor situated within the first chamber,
wherein the first sensor measures at least one of a displacement of the forming layer relative to the base layer, a temperature of the air within the first chamber, a pressure of the air within the first chamber, and a humidity of the air within the first chamber.

* * * * *